US005502599A

United States Patent [19]
Kanno et al.

[11] Patent Number: 5,502,599
[45] Date of Patent: Mar. 26, 1996

[54] CONDUCTIVE CONNECTOR FOR CAMERA SYSTEM COMPONENTS

[75] Inventors: Hideo Kanno, Chiba; Nobuyoshi Nasu, Yokohama, both of Japan

[73] Assignee: Nikon Corporation, Tokyo, Japan

[21] Appl. No.: 247,076

[22] Filed: May 20, 1994

[30]     Foreign Application Priority Data

Jul. 27, 1993  [JP]  Japan ................................... 5-204635
Jul. 27, 1993  [JP]  Japan ................................... 5-204636

[51] Int. Cl.⁶ ............................. G03B 17/00; G02B 7/02
[52] U.S. Cl. ................................. 359/827; 354/286
[58] Field of Search .................................. 359/827, 829; 354/286

[56]            References Cited

U.S. PATENT DOCUMENTS

| 4,420,239 | 12/1983 | Yasuyuki | 359/828 |
| 4,448,509 | 5/1984 | Katsuma | 359/828 |
| 5,185,622 | 2/1993 | Yoshibe | 354/286 |
| 5,447,442 | 9/1995 | Swart | 439/77 |

FOREIGN PATENT DOCUMENTS 6-3740   1/1994   Japan .

*Primary Examiner*—Georgia Y. Epps
*Assistant Examiner*—Ricky Mack

[57]                    ABSTRACT

A connector including a first connector cover having a first engaging portion, a second connector cover having a second engaging portion for engaging with the first engaging portion and adapted to be mounted in a superposed manner on the first connector cover, plural contact members positioned between the first and second connector covers and having plural movable contact pins biased as to protrude from the external face of the first connector cover, and a conductive pattern bearing member positioned partly between the first and second connector covers and provided with conductive patterns on a face contacting the movable contact pins. The first connector cover is further provided with a third engaging portion, while the conductive pattern bearing member is provided with a fourth engaging portion for positioning the conductive pattern bearing member relative to the first connector cover by engagement with the third engaging portion.

9 Claims, 5 Drawing Sheets

CONDUCTIVE CONNECTOR FOR CAMERA SYSTEM COMPONENTS

BACKGROUND OF THE INVENTION

1. Field of the Invention

The present invention relates to a connector provided on a camera body, an interchangeable lens, an accessory or the like (hereinafter collectively called components) constituting a camera system and serving to electrically connect such components.

2. Related Background Art

In conventional camera systems, there has widely been employed a rotary bayonet mount for effecting attachment and detachment of the components. Such rotary bayonet mount is designed to effect attachment or detachment of the components by relative clockwise or anticlockwise rotation of the components.

In such camera system, each component is provided with an electric circuit, and information (for example that for automatic exposure control) is exchanged between the components. For such information exchange, a connector having plural contact pins is provided in the vicinity of the mount of each component.

Such a conventional connector as mentioned above will be explained in the following.

The connector comprises an upper cover, a lower cover, contact springs positioned between these covers and provided with the above-mentioned contact pins, and a conductive pattern bearing member provided with the above-mentioned electrical circuit to be connected to the contact springs.

Such a conventional connector is assembled by placing the contact springs and the conductive pattern bearing member in succession on the upper cover, thereby bringing the two in mutual contact and forming an electrical connection therebetween, then placing the lower cover in superposition with the upper cover so as to sandwich the contact springs and the conductive pattern bearing member therebetween, and providing ultrasonic vibration to heat and fuse the contact face of the upper and lower covers, thereby achieving fixation. In this manner the upper and lower covers are mutually connected and the connector is completed.

In the above-mentioned conventional connector, however, the biasing force of the contact springs is exerted in a direction to mutually separate the upper and lower covers (this force being hereinafter called a separating force), so that, if a large number of contact springs are provided on the circumference of the connector, the separating force becomes larger to render the fused fixation of the upper and lower covers difficult. Also, the fused portion may deteriorate in time, eventually resulting in separation of the upper and lower covers.

In order to overcome the above-mentioned drawbacks, the present inventors already proposed to provide the upper and lower covers respectively with engaging parts and to cause mutual engagement of such engaging parts by a sliding motion of the lower cover relative to the upper cover, thereby achieving mutual connection of the two (Japanese Patent Application No. 4-162578).

However, such sliding motion of the lower cover relative to the upper cover tends to displace the conductive pattern bearing member together with the lower cover, so that it has been difficult to mount the lower cover while maintaining the conductive pattern bearing member in the predetermined position. Also, the assembly with the conductive pattern bearing member in the displaced state may result in short-circuiting of the contact pins of the neighboring contact springs.

In addition, the upper and lower covers have to be securely fixed, for example, with screws. However, if the above-mentioned separating force is large when the covers are made, for example, of a plastic material, the female threads formed therein may be damaged by such a separating force. Consequently, the cover bearing such female threads has to be made of a metal material, in consideration of the mechanical strength.

However, if the cover is made of metal, burs on the cut sections of plating leads of conductive patterns on the conductive pattern bearing member may touch such a metallic cover, thus causing defective electrical contact. For avoiding such drawback, it is conceivable to apply an insulating tape between the cover made of metallic material and the conductive pattern bearing member, or to form the plating leads of the conductive pattern bearing member in other positions. However, such application of the insulating tape will lead to a drawback of an assembling operation having a reduced efficiency and an elevated cost, while limitation in the position of the plating leads will result in another drawback of reduced freedom in the designing of the conductive pattern bearing member.

SUMMARY OF THE INVENTION

An object of the present invention is to provide a connector which allows a connection of upper and lower covers with a sufficinetly high strength and capable of preventing positional displacement of a conductive pattern bearing member at the assembling operation.

Another object of the present invention is to provide a connector which allows fixation of the upper and lower covers, and of a mount portion, with a sufficiently high strength, and secure insulation between the conductive pattern bearing member and the covers.

The above-mentioned objects can be attained, according to the present invention, by a connector comprising a first connector cover provided with a first engaging portion, a second connector cover provided with a second engaging portion adapted to engage with said first engaging portion and adapted to be mounted on said first connector cover in superposition therewith, plural contact members positioned between said first and second connector covers and provided with movable contact pins biased in such a direction as to protrude from the external face of said first connector cover, and a conductive pattern bearing member positioned partly between said first and second connector covers and provided with conductive patterns on a face thereof contacting said movable contact pins, wherein said first connector cover is further provided with a third engaging portion while said conductive pattern bearing member is provided with a fourth engaging portion adapted to be positioned with respect to said first connector cover by engaging with said third engaging portion.

In the above-mentioned connector, the first and second connector covers are mutually connected by the engagement of the first and second engaging portions provided respectively thereon. Also the fourth engaging portion formed on the conductive pattern bearing member engages with the third engaging portion formed on the first connector cover, whereby the conductive pattern bearing member is positioned with respect to the first connector cover. Thus the first and second connector covers are connected with a sufficient strength, and the displacement of the conductive pattern bearing member can be prevented at the mounting operation of the second connector cover.

The above-mentioned objects can be attained, according to a first embodiment of the present invention, by a connector comprising a first connector cover formed with an insulating material and provided with a first engaging portion, a second connector cover formed with a metallic material, provided with a second engaging portion adapted to engage with said first engaging portion and adapted to be mounted on said first connector cover in superposition therewith, plural contact members positioned between said first and second connector covers and provided with movable contact pins biased in such a direction as to protrude from the external face of said first connector cover, and a conductive pattern bearing member positioned partly between said first and second connector covers and provided with conductive patterns on a face thereof contacting said movable contact pins, wherein said conductive pattern bearing member is provided with a plating lead portion extending from said conductive patterns to an end portion of said member, wherein said end portion bearing said plating lead portion is positioned with a predetermined gap from an adjacent end of said second connector cover.

In a second embodiment of the connector of the present invention, said first connector cover is provided with a hole while said second connector cover is provided with a female screw thread, whereby said first and second connector covers are mutually fixed by a male screw penetrating said hole and engaging with said female screw thread.

In the first embodiment of the connector, the end portion of the conductive pattern bearing member, bearing the plating lead portion thereon, is separated with a predetermined gap from the adjacent end of the second connector cover, so that the plating lead portion is always maintained free from contact with the second connector cover. Consequently, the plating lead portion can be securely insulated even when the second connector cover adjacent to the conductive pattern bearing member is made of a metallic material.

In the second embodiment of the connector, the second connector cover made of a metallic material is provided with a female screw thread which engages with a male screw penetrating the first connector cover, whereby the first and second connector covers are fixed. These covers can be fixed with a sufficient strength as the female screw is composed of the metallic material, and said screw can be utilized for fixing the mount to the connector with a sufficiently high strength.

DETAILED DESCRIPTION OF THE PREFERRED EMBODIMENTS

Figure 1:
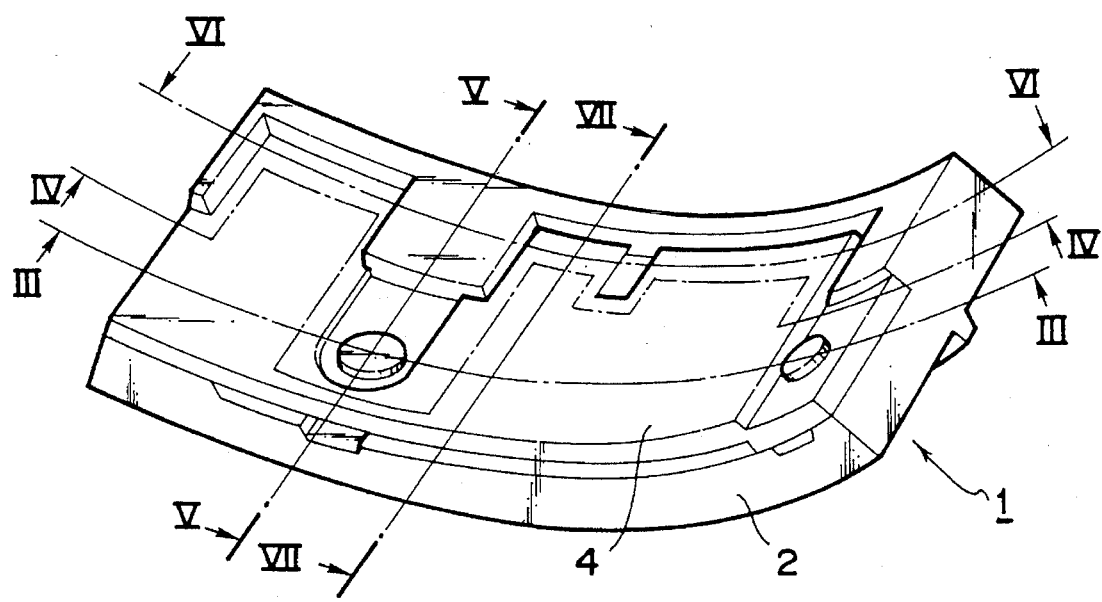
FIG. 1 is a first external perspective view of an embodiment of the connector of the present invention.
Figure 2:
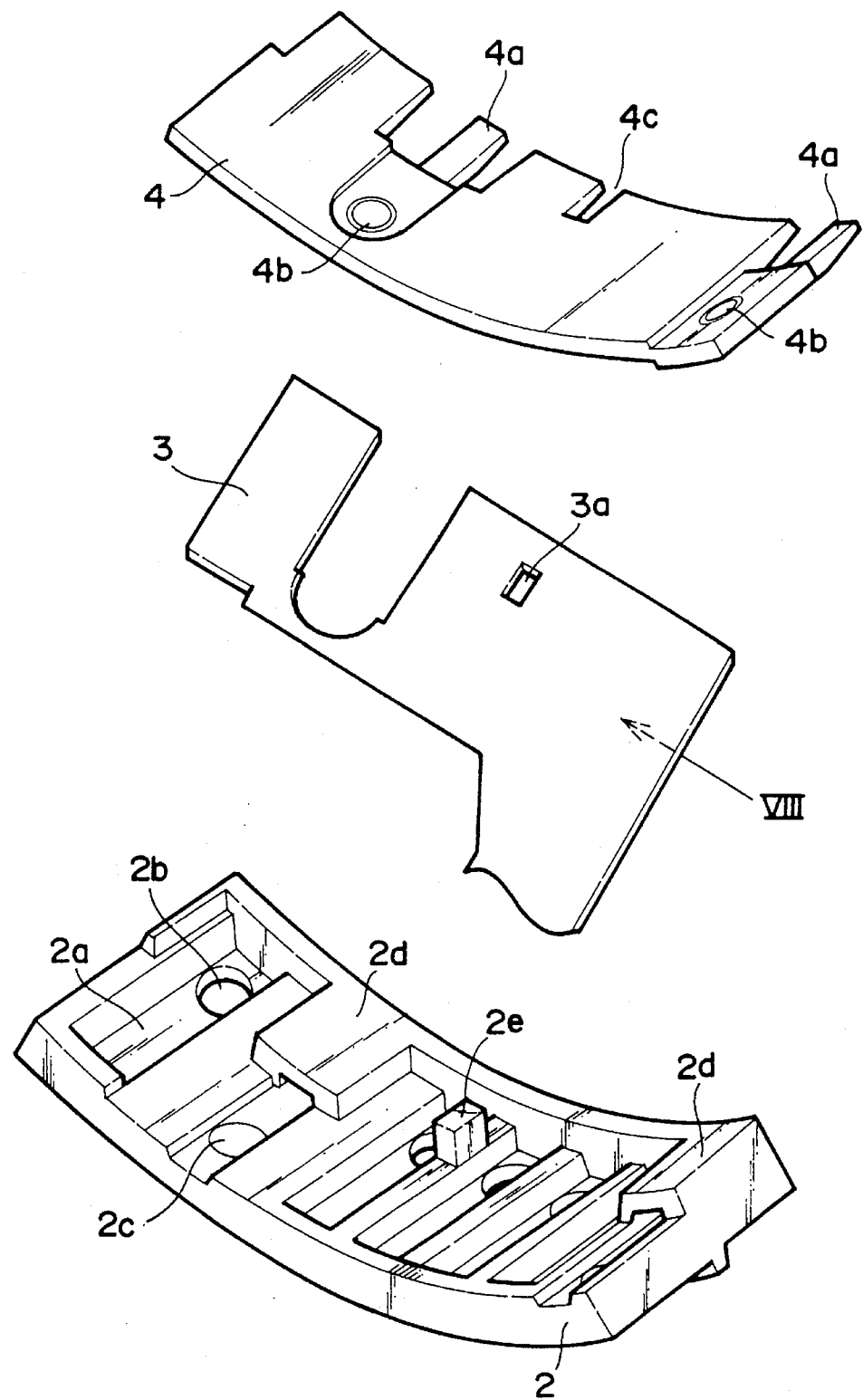
FIG. 2 is an exploded perspective view of an upper cover 3, a conductive pattern bearing member 3, and a lower cover 1 of the connector 1 shown in FIG. 1.

In the following, there will be explained a first embodiment of the connector of the present invention, with reference to the attached drawings. FIG. 1 is an external perspective view of the first embodiment of the connector 1 of the present invention; FIG. 2 is an exploded perspective view of an upper cover 2, a conductive pattern bearing member 3 and a lower cover 4; FIGS. 3 to 7 are cross-sectional views, respectively, along lines III—III to VII—VII shown in FIG. 1; and FIG. 8 is a plan view of the conductive pattern bearing member 3 seen from a direction VIII shown in FIG. 2.

Figure 7:
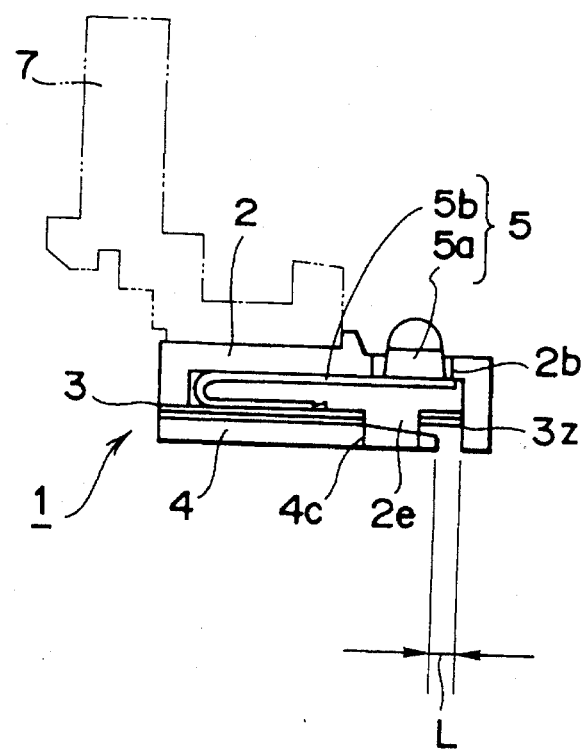
FIG. 7 is a cross-sectional view along a line VII—VII in FIG. 1.
Figure 8:
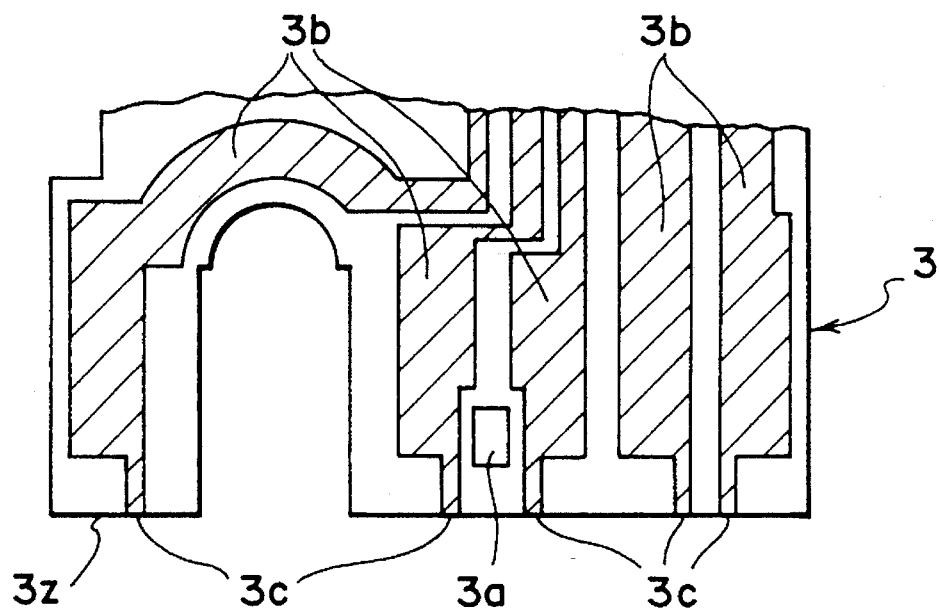
FIG. 8 is a plan view of the conductive pattern bearing member, seen from a direction VIII shown in FIG. 2.

As shown in FIG. 7, a connector 1 is positioned at a lower side of a bayonet mount 7 (indicated by chain lines) for an interchangeable lens. The connector 1 comprises an upper cover 2, a lower cover 4, contact members 5 positioned between the upper cover 2 and the lower cover 4, and a conductive pattern bearing member 3. The upper cover 2 is molded, for example, with a plastic material, while the lower cover 4 is formed, for example, by pressing of a metallic material. The contact members 5 are provided in a plural number along the circumference of the connector 1 (cf. FIG. 4), and serve to contact the contact members of another connector, thereby forming as electric connection therewith. The conductive pattern bearing member 3 comprises a flexible printed circuit board, bearing conductive patterns 3b (cf. FIG. 8) on a face coming into contact with the contact members 5.

Figure 5:
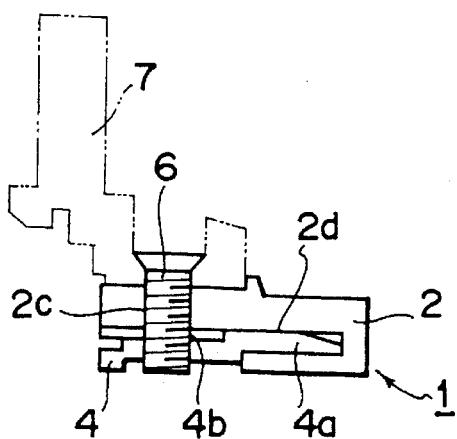
FIG. 5 is a cross-sectional view along a line V—V in FIG. 1.
Figure 6:
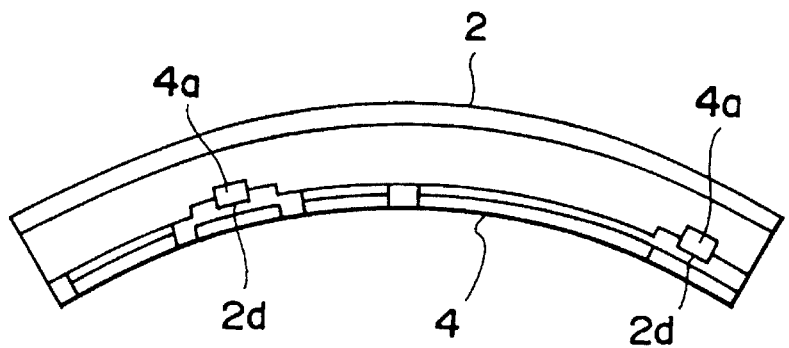
FIG. 6 is a cross-sectional view along a line VI—VI in FIG. 1.

As shown in FIG. 5, the connector 1 and the bayonet mount 7 are fixed by a male screw 6.

In the following, there will be explained the structure of the connector 1. At first there will be given an explanation on the upper cover 2 and the lower cover 4 with reference to FIG. 2. For the purpose of clarity, the parts in FIG. 2 are illustrated in a state seen from below.

On the internal periphery of the upper cover 2, there are provided plural grooves 2a and holes 2b in a parallel manner along the circumferential direction. A groove 2a, serving to accommodate a contact member 5, is extended in the axial direction and has a substantially rectangularly recessed cross section (cf. FIG. 3). The hole 2b, formed in the groove 2a, accommodates a contact pin 5a of the contact member 5 (cf. FIG. 4).

Also, on the internal periphery of the upper cover 2, at a side thereof closer to the camera body (right-hand side in FIG. 2), there are formed two engaging portions 2d along the circumference thereof. Each of the engaging portions 2d, for engaging with the lower cover 4, has a substantially square U-shaped cross section (cf. FIG. 5).

Figure 3:
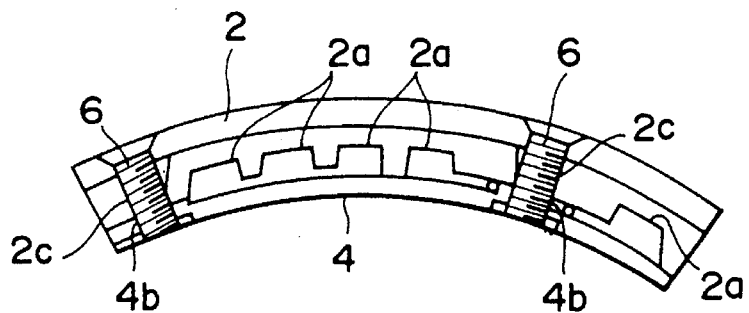
FIG. 3 is a cross-sectional view along a line III—III in FIG. 1.
Figure 4:
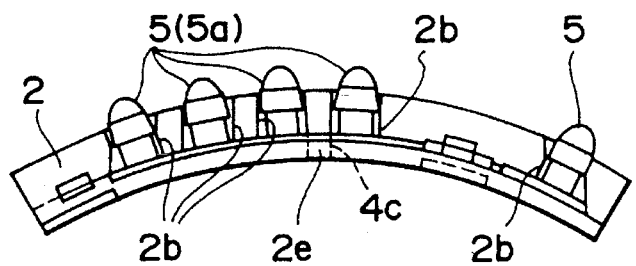
FIG. 4 is a cross-sectional view along a line IV—IV in FIG. 1.

In addition, the upper cover 2 is provided with two holes 2c, formed in a parallel manner along the circumferential direction, for accepting male screws 6 (cf. FIGS. 3 and 5). Furthermore, at the approximate center of the upper cover 2, there is formed a projecting portion 2e, protruding toward the lower cover 4 (toward above in FIG. 2). The projecting portion 2e serves to properly position the conductive pattern bearing member 3 and the lower cover 4, when these are mounted on the upper cover 2.

The lower cover 4 is provided, at a side thereof closer to the camera body, with two axially extended engaging portions 4a, in a parallel manner along the circumferential direction. The engaging portions 4a serve to engage with the engaging portions 2d of the upper cover 2, as explained before. The lower cover 4 is also provided with two female screws 4b, in parallel manner along the circumferential direction, for engaging with the male screws 6 penetrating the holes 2c of the upper cover 2 and the bayonet mount 7 positioned on the upper cover 2 (cf. FIGS. 3 and 5). Furthermore, the lower cover 4 is provided, at the approximate center thereof, with a notch 4c on a lateral side thereof, for engaging with the projecting portion 2e of the upper cover 2 (cf. FIGS. 4 and 7).

In the following, there will be given an explanation on of the contact member 5, with reference to FIG. 7.

The contact member 5 comprises a contact pin 5a provided at an end thereof, and an elastic member 5b, such as a plate spring, having a substantially U-shaped cross section. The contact pin 5a is so positioned as to protrude externally from the hole 2b of the upper cover 2. The elastic member 5b biases the contact pin 5a in the upward direction in FIG. 7, and supports the same in a vertically movable state. The biasing force of the elastic member 5b functions as a force to mutually separate the upper cover 2 and the lower cover 4.

In the following there will be given an explanation on the conductive pattern bearing member 3, with reference to FIG. 8.

The face shown in FIG. 8 is opposed to the contact members 5 (upper face in FIG. 7), and bears conductive patterns 3b thereon. These conductive patterns 3b are extended to an end portion 3z of the conductive pattern bearing member 3, and a plating lead portion 3c for gold plating is formed from the end 3z to the vicinity thereof. Also, at the approximate center of the conductive pattern bearing member 3, there is formed a hole 3a, for engaging with the projection portion 2e of the upper cover 2.

In the following, there will be explained the assembling method of the connector 1.

At first the upper cover 2 is positioned upside down as shown in FIG. 2. Then the contact members 5 are placed in the respective grooves 2a of said upper cover 2 (cf. FIGS. 4 and 7). Then the conductive pattern bearing member 3 is placed thereon, in such a manner that the face bearing the conductive patterns 3b is positioned downwards so as to form mutual contact between the conductive patterns 3b and the contact members 5 and that the projecting portion 2e of the upper cover 2 is inserted into the hole 3a of the conductive pattern bearing member 3 (cf. FIG. 7). Thus the conductive pattern bearing member 3 is positioned with respect to the upper cover 2 and is prevented from displacement. In this state, the end portion 3z of the conductive pattern bearing member 3 is positioned at the internal wall or in the vicinity thereof, of the upper cover 2 (cf. FIG. 7).

Then, the lower cover 4 is mounted while the above-explained state is maintained. The mounting is achieved by sliding the lower cover 4 in the axial direction, with respect to the upper cover 2, thereby causing the engaging portions 4a of the lower cover 4 to engage with the engaging portions 2d of the upper cover 2 (cf. FIGS. 5 and 6), whereby the notch 4c of the lower cover 4 engages with the projecting portion 2e of the upper cover 2 (cf. FIGS. 4 and 7). The connector 1 is completed by the above-explained steps.

In this state, as shown in FIG. 7, an end (right-hand end in FIG. 7) of the lower cover 4 outside the engaging portion 4a is distanced by a clearance L from the end portion 3z of the conductive pattern bearing member 3. Consequently, the end portion 3z of the conductive pattern bearing member 3 is maintained free of contact, namely is insulated, from the right-hand end of the lower cover 4. Therefore, even if the end portion 3z of the conductive pattern bearing member 3 has burs of the plating lead portion 3c (FIG. 8), there will not be formed defective conduction by the eventual contact with the lower cover 4. The above-mentioned sliding motion does not cause displacement of the conductive pattern bearing member 3 as it is already positioned to the upper cover 2.

Figure 9:
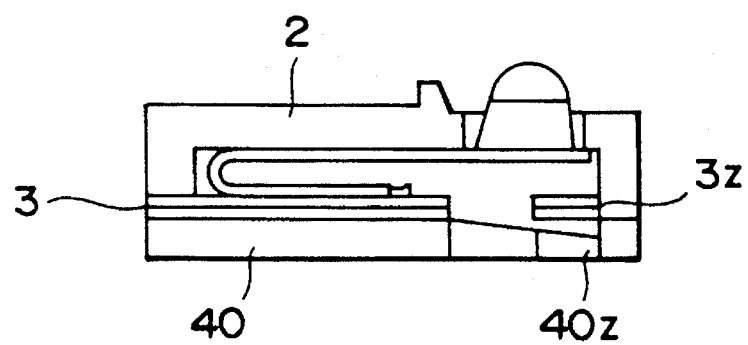
FIG. 9 is a view showing a second embodiment of the connector of the present invention.

In another embodiment shown in FIG. 9, an end 40z of the lower cover 40 is extended to the end portion 3z of the conductive pattern bearing member 3, so that the clearance does not exist therebetween. However, the end portion 40z is tapered, so that it is maintained free of contact with the end portion 3z.

As shown in FIG. 5, the male screw 6, penetrating the bayonet mount 7 and the hole 2c of the upper cover 2, engages with the female screw 4b of the lower cover 4, thereby fixing the upper cover 2 and the lower cover 4, and the bayonet mount 7 and the connector 1.

The present invention has been explained by an embodiment thereof, but the present invention is not limited thereto and is subject to various modifications within the scope and spirit of the appended claims.

For example, the connector of the present invention may be provided on the camera body, instead of being provided on the interchangeable lens as in the foregoing embodiment. Also, it may be used in a teleconverter or for the DX contacts for a film cartridge.

The connector of the present invention can prevent the separation of the first and second connector covers even in the presence of the separating force resulting from the biasing force of the contact members, since the first and second engaging portions formed respectively on the connector covers provide mechanically strong engagement. Also, as the conductive pattern bearing member engages with the first connector cover at the assembling operation, the conductive pattern bearing member can be prevented from displacement even by the sliding connection of the second connector cover relative to the first connector cover. It is therefore rendered possible to achieve secure contact of the contact members with the predetermined conductive patterns and to avoid, for example, shortcircuiting resulting from defective assembly. Also, the assembling operation is facilitated and the efficiency thereof is improved.

Also the connector of the present invention can achieve secure insulation of the plating lead portion of the conductive pattern bearing member, as the plating lead portion and the second connector cover of metallic material are always maintained in a contact-free state. It is thus rendered possible to reduce the defect rate in the manufacture of the connector, and to dispense with an additional insulating measure, such as the application of an insulating tape, thereby improving the efficiency in the manufacture of the connector. Furthermore, it is made possible to eliminate the limitation in the designing of the conductive pattern bearing member.

Furthermore, in the connector of the present invention, female screw threads are formed in the second connector cover of metallic material and the first and second connector covers are mutually fixed with screws, so that the two can be fixed with a sufficiently high strength even under the presence of the separating force exerted therebetween by the biasing force of the contact members. Besides, the screws can be utilized for mounting the mount with a sufficiently high strength with the connector. Also, the connection of the first and second connector covers by assembling instead of fusion provides a higher yield in the manufacture, a lowered manufacturing cost and a higher efficiency of the assembling operation. Furthermore, the maintenance operation is facilitated as the first and second connector covers can be disassembled again.

What is claimed is:

1. A connector comprising:

a first connector cover with a first engaging portion;

a second connector cover with a second engaging portion being engageable with said first engaging portion to establish a connection between said first and second connector covers, said second connector cover being mountable on said first connector cover in a superposed manner therewith when said first engaging portion is engaged with said second engaging portion;

plural contact members positioned between said first and second connector covers and provided with movable contact pins biased in a direction as to protrude from an external face of said first connector cover; and a conductive pattern bearing member positioned partly between said first and second connector covers and having conductive patterns formed on a face thereof, said conductive patterns contacting said movable contact pins;

wherein said first connector cover has a third engaging portion, and said conductive pattern bearing member has a fourth engaging portion for positioning said conductive pattern bearing member with respect to said first connector cover by engagement with said third engaging portion, and for preventing a deviation of said second connector cover upon attachment of said second connector cover to said first connector cover.

2. The connector according to claim 1, wherein said first and said fourth engaging portions are respectively formed by recessed portions, said second and said third engaging portions are respectively formed by projecting portions, and said engagement is established by insertion of each projecting portion into a corresponding recessed portion.

3. The connector according to claim 2, wherein said second engaging portion is formed in a first direction perpendicular to a second direction in which said first connector cover superposes said second connector cover, and said third engaging portion is formed in the second direction.

4. The connector according to claim 1, wherein said first connector cover is an insulating material and said second connector cover is a metallic material.

5. A connector comprising:

a first connector cover with a first engaging portion;

a second connector cover with a second engaging portion being engageable with said first engaging portion to establish a connection between said first and second conductor covers, said second connector cover being mountable on said first connector cover in a superposed manner therewith when said first engaging portion is engaged with said second engaging portion;

plural contact members positioned between said first and said second connector covers provided with movable contact pins biased in a direction as to protrude from an external face of said first connector cover; and a conductive pattern bearing member positioned partly between said first and said second connector covers, having conductive patterns formed on a face thereof, said conductive patterns contacting said movable contact pins;

wherein said conductive pattern bearing member has a plating lead portion extending from said conductive patterns to an end of said conductive pattern bearing member, and said end of said plating lead portion is positioned with a predetermined clearance from an adjacent end of said second connector cover.

6. The connector according to claim 5, wherein said first connector cover is an insulating material and said second connector cover is a metallic material.

7. A connector comprising:

a first connector cover with a first engaging portion;

a second connector cover with a second engaging portion being engageable with said first engaging portion to establish a connection between said first and second connector covers, said second connector cover being mountable on said first connector cover in a superposed manner therewith when said first engaging portion is engaged with said second engaging portion;

plural contact members positioned between said first and said second connector covers and provided with movable contact pins biased in a direction as to protrude from an external face of said first connector cover; and a conductive pattern bearing member positioned partly between said first and said second connector covers, and having conductive patterns formed on a face thereof, said conductive patterns contacting said movable contact pins;

wherein said conductive pattern bearing member has a plating lead portion extending from said conductive patterns to an end of said conductive pattern bearing member, and said second engaging portion is provided with an escape portion for avoiding contact with said plating lead portion at said end of said conductive pattern bearing member.

8. The connector according to claim 7, wherein said second engaging portion is tapered to form said escape portion.

9. The connector according to claim 7, wherein said first connector cover is an insulating material and said second connector cover is a metallic material.

* * * * *